July 28, 1959  F. P. FORD ET AL  2,897,164
BUTYL RUBBER CO-VULCANIZATES
Filed Dec. 30, 1955
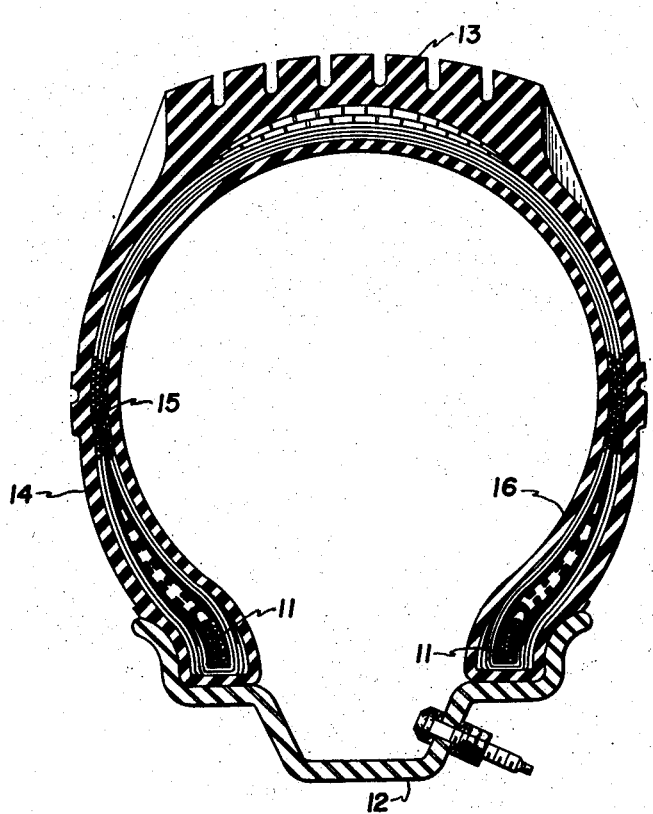
Francis P. Ford   Inventors
James V. Fusco
By W. H. Smyers   Attorney United States Patent Office 2,897,164
Patented July 28, 1959

2,897,164

BUTYL RUBBER CO-VULCANIZATES

Francis P. Ford, Watchung, and James V. Fusco, Fanwood, N.J., assignors to Esso Research and Engineering Company, a corporation of Delaware Application December 30, 1955, Serial No. 556,511

7 Claims. (Cl. 260—5)

This invention relates to new and useful co-vulcanizable admixtures of Butyl rubber and highly unsaturated rubbers and to methods for curing mixtures of Butyl rubber with more highly unsaturated rubbers in the presence of certain metal oxides and curing agents such as sulfur or sulfur-containing compounds, zinc oxide, and ultra-accelerators, especially of thiuram and carbamic acid derivatives.

The present invention relates more particularly to processes for producing co-vulcanizable mixtures and co-vulcanizing said mixtures which are of Butyl rubber with natural rubber, rubbery copolymers of butadiene and styrene (GR-S rubber) and/or rubbery copolymers of butadiene and acrylonitrile (Buna-N rubber) with sulfur and/or sulfur-containing curatives in the presence of bismuth oxides or cuprous oxide as a co-vulcanization aid. The use of the above metal oxides, in accordance with the present invention, is especially effective when using accelerators of the type known as "ultra accelerators." These ultra-accelerators have been widely used in vulcanization of Butyl rubber.

A general process according to the present invention comprises forming a composition comprising about 100 parts by weight of an admixture of 1 to 99 parts by weight of Butyl rubber and 1 to 99 parts by weight of at least one other highly unsaturated rubber, sulfur, about 2–30 parts by weight (preferably about 3–20 parts by weight) of a bismuth oxide or cuprous oxide, about 0–50 parts by weight of zinc oxide, and a vulcanization ultra-accelerator. The above new and useful co-vulcanizable composition is then sulfur-cured at a temperature of about 250°–400° F. for about a minute up to about several hours or more to give improved co-vulcanizates.

By such a process as the above, new and improved co-vulcanizable rubbery compositions are formed by compounding unvulcanized Butyl rubber, Butyl reclaim, and/or partially vulcanized Butyl rubber with the above cuprous and/or bismuth oxides, a highly unsaturated natural rubber, GR-S rubber and/or Buna-N rubber, vulcanizing quantities of sulfur and/or a sulfur-containing curing agent and optionally but preferably with conventional amounts (i.e. about 0–30 parts, preferably about 5–10 parts by wt. per 100 parts by wt. of total rubber hydrocarbon) of zinc oxide, about 0–5 parts by wt. of vulcanization ultra-accelerators such as tetra alkyl thiuram sulfides, alkyl thio-carbamates such as diethyl dithio-carbamate, zinc dithio-carbamate, etc.

It has heretofore been considered impossible to obtain satisfactory vulcanizates from blends of Butyl rubber and more higly unsaturated rubbery polymers such as GR-S, natural rubber or Buna-N rubber, especially where the amount of highly unsaturated rubber polymer is greater than about 4% by weight. Heretofore, the blend of Butyl rubber and more highly unsaturated rubbers when vulcanized have produced a product wherein severe blistering occurs and wherein the porosity of the vulcanizates is high. In general, the vulcanized products of such blends are not homogenous and are laminated. Furthermore, their tensile strengths are inferior and they tend to crack and peel.

The inability of ordinary Butyl rubber to cure with all proportions of highly unsaturated rubbers such as natural rubber, GR-S, Buna-N, etc., is pointed out in the 1954 edition of "Synthetic Rubber" by G. S. Whitby and in such patents as U.S. No. 2,631,984 and U.S. No. 2,681,-899, and others, wherein it is stated that there is a substantial inability of Butyl rubber and other highly unsaturated rubbers to co-vulcanize, etc The failure of Butyl rubber to satisfactorily cure with all proportions of other common rubbers such as natural rubber, GR-S, Buna-N etc., has been a serious obstacle to the more extensive use of Butyl rubber in rubber-containing articles such as various laminated structures including flexible rubber belts, hosing, and rubber tires, where in many instances, a blend of various rubbers is desirable, but only if the rubbers are compatible with one another and may be adhesively joined, co-vulcanized, etc.

The discovery of the present invention has been particularly surprising since bismuth oxides or cuprous oxide retard the curing rate of Butyl rubber. It has heretofore been commonly believed that the large discrepancy in curing rates of slow curing Butyl rubber compared to fast curing GR-S or natural rubber was a prime factor in causing poor vulcanizates of admixtures of Butyl rubber with such other rubbers. It was further believed that the presence of any materials which retarded the curing rate of Butyl rubber such as cuprous or bismuth oxides would widen the above curing rate discrepancy between Butyl rubber and highly unsaturated rubbers and thus preclude satisfactory co-vulcanization. Therefore, the finding of the present invention that the use of bismuth oxides or cuprous oxide renders Butyl rubber satisfactorily co-vulcanizable with highly unsaturated rubbers is most unexpected in view of the above.

It is a further discovery of the present invention that the use of bismuth oxides or cuprous oxide while retarding the curing rate of Butyl rubber per se in fact accelerates the curing rate of admixtures of Butyl rubber with highly unsaturated rubbers such as GR-S, natural rubber, Buna-N rubber, etc. In fact, the curing rate of the rubbery blends of the present invention is higher than the curing rate of either of the component rubbers.

As pointed out heretofore, the metal oxides of the present invention are particularly effective in conjunction with the so-called "ultra accelerators." Typical accellerators of this type are, for example, tetra methyl thiuram disulfide or tellurium diethyl dithio-carbamate. In general, the above types of ultra-accelerators heretofore utilized in the curing of Butyl rubber are satisfactory in conjunction with a bismuth oxide or cuprous oxide.

The invention will be demonstrated hereinafter with reference to the accompanying drawing, in which the single figure is a cross-sectional view of a pneumatic tubeless tire employing therein a Butyl rubber co-vulcanized with other highly unsaturated rubbers according to the present invention, wherein the tire is shown as being mounted on a conventional tubeless type of tire wheel and rim.

The Butyl rubber of the present invention generally comprises a copolymer of a major proportion of an isoolefin such as relatively low molecular weight $C_4$–$C_8$ isoolefin (e.g. isobutylene) and a minor proportion of a $C_4$–$C_{14}$ multi-olefin, preferably having a ratio of the isoolefin to the multi-olefin of about 85–99.5% to about 15–0.5% respectively. Copolymers of the above general type, especially where the copolymer is about 90% to about 99.5% of a $C_4$–$C_7$ isoolefin such as isobutylene with about 10 to 0.5% of a multi-olefin of about 4 to 10, preferably 4 to 6 or 8 carbon atoms are commonly referred to in patents and literature as "Butyl rubber" or GR-I rubber (Government Rubber-Isobutylene) and, for example, is referred to as "Butyl rubber" in patents and in textbook "Synthetic Rubber" by G. S. Whitby (1954 edition). The preparation of butyl-type rubbers is described in U.S. Patent 2,356,128 to Thomas et al. and also in other patents as well as in literature. In general the rubber comprises the reaction product of a $C_4$–$C_7$ isoolefin (preferably isobutylene) with a $C_4$–$C_{10}$ multiolefin such as, isoprene, butadiene, dimethyl butadiene, myrcene, piperylene, aloocimene, etc. The reaction product of isobutylene and isoprene is preferred.

In general, the polymer has a Staudinger molecular weight within the range between about 20,000 and 100,000. The viscosity average molecular weight is preferably above about 300,000 up to about 1,500,000 or higher. The iodine number (Wijs) is in the range from about 1 to 50, preferably in the range from about 1 to 20. The above copolymer when cured has good elasticity, tensile strength, abrasion resistance and flexure resistance. The butyl copolymer may be compounded with various fillers, pigments, plasticizers and antioxidants.

Typical highly unsaturated rubbers for use in the blend of the present invention as mentioned heretofore, are a copolymer of butadiene and styrene (GR–S), natural rubber, and Buna–N bubber which is the reaction product of butadiene and acrylonitrile.

(GR–S) is preferably obtained by polymerizing butadiene styrene in aqueous emulsion. Polymerization is initiated by bringing the monomer mixture to a temperature between about $-40°$ C. and about $+100°$ C., preferably between about $-40°$ C. to about $+50°$ C., in the presence of a substance capable of accelerating the reaction such as a peroxide or persulfate with or without added solvents. When polymerization is complete the polymer is separated from unreacted monomer and/or solvent and water generally by distillation.

The above general process for producing GR–S rubber may likewise be generally employed for producing Buna–N rubber, which is a copolymer of butadiene and acrylonitrile and other rubbery polymers as hereinafter indicated. It may be applied, for example, to polymers obtained by the polymerization in aqueous emulsion of conjugated diolefins, such as butadiene, isoprene, piperylene, dimethyl butadiene, 2-chlorobutadiene-1,3, taken singly or in combination, or to emulsion copolymerizates obtained by polymerizing such diolefins in combination with unsaturated comonomers, i.e., copolymerizable compounds containing a single terminal methylene group such as styrene (above). and also homologues of styrene, such as alpha methyl styrene, para methyl styrene, alpha methyl para methyl styrene, nitriles of low molecular weight unsaturated acids such as acrylonitrile (above), methacrylonitrile, chloroacrylonitrile, methyl acrylate, methyl methacrylate and ketones such as methyl vinyl ketone or mixtures thereof.

Other highly unsaturated synthetic rubbers employed according to the present invention may be polymers of substituted butadienes-1,3 which include butadiene-1,3 or its homologs such as isoprene and 2,3-dimethyl butadiene, where the substituents are either chlorine or cyano grouus, or the synthetic rubbers may be rubbery copolymers of various of the butadienes-1,3 with other ethylenic monomers, and in this case either the butadienes or the ethylenic monomer or both the butadienes and the ethylenic monomer may contain substituents of chlorine or cyano groups. The copolymer generally contains at least 50% by weight of one of the butadienes-1,3. Such compounds useful in the present invention include polymers of 3-chloro butadiene-1,3, 3-bromo butadiene-1,3; 3-cyano butadiene-1,3 chloro isoprene, bromo isoprene, and cyano isoprene. They also include polymers of butadiene-1,3 with vinylidene chloride, p-chloro styrene, or methyl alpha chloro acrylate; copolymers of 3-chloro butadiene-1,2 with the above and/or with acrylonitrile, methacrylonitrile, etc.; copolymers of 3-cyano butadiene-1,3 with the above; copolymers of 2,3-dimethyl butadiene with either 3-chloro butadiene-1,3 or 3-cyano butadiene-1,3 etc. Those compounds which are copolymerized with the butadienes are preferably ethylenic monomers and it is preferred that thye contain a $CH_2$=C< group. This is not absolutely necessary, however, as ethylenic monomers containing only one or more >C=C< groups are also workable. Vulcanization may be obtained either at ordinary room temperature or at higher temperatures, depending upon the choice of vulcanization accelerators.

The respective quantities of the Butyl rubber utilized in conjunction with the highly unsaturated rubber or rubbers may vary appreciably, as for example, 99% by weight of butyl to 1% by weight of the unsaturated rubber; to 1% of butyl and 99% by weight of the unsaturated rubber. The proportions of each component used will depend to a great extent upon the ultimate use for which the product is designed. It is to be understood that the butyl rubber may comprise any proportion of butyl reclaim rubber, partially vulcanized Butyl rubber etc., alone or in conjunction with Butyl rubber.

The amount of bismuth oxide or cuprous oxide used may likewise vary appreciably. In general, it is advantageous to use about 3 to 30 weight percent and preferably 3 or 5 to 20 weight percent based upon the total amount of rubber present. The amount of accelerator used will vary somewhat depending upon the particular compound used. In general, it is preferred to use 0.1 to 2.0 parts by weight of an ultra-accelerator based upon the amount of rubber. The vulcanization conditions may vary in the range from about 250° to 400° F., preferably about 280° to 320° F., for about a minute up to about several hours or more. Preferred times are from about 10 minutes to 2 hours.

In order to more fully illustrate the invention, the following examples are given:

*Example I*

A master batch of butyl and GR–S rubber, together with conventional fillers and curing agents, was prepared of the following composition:

| Composition: | Parts by Weight |
|---|---|
| Butyl rubber (GR–I–17) | 75 |
| GR–S rubber | 25 |
| Carbon black (S.R.F.) | 50 |
| Zinc oxide | 5.0 |
| Stearic acid | 0.5 |
| Tetra methyl thiuram disulfide | 1.0 |
| Sulfur | 3.0 |

Seventeen portions of the above composition were cured at 307° F. for 40 minutes in the presence of 5 parts by weight of various co-vulcanization agents, three of which were either bismuth oxides or cuprous oxide. The results of these tests were as follows:

| Co-vulcanization agent: | P.s.i. Tensile |
|---|---|
| 1. $Bi_2O_3$ | 1,290 |
| 2. $Bi_2O_5$ | 1,135 |
| 3. $Cu_2O$ | 1,085 |
| 4. SnO | 615 |
| 5. $SnO_2$ | 640 |
| 6. $ThO_2$ | 580 |
| 7. $ZrO_2$ | 605 |
| 8. $Fe(SCN)_2$ | 695 |
| 9. $TiO_2$ | 655 |
| 10. $MnO_2$ | 610 |
| 11. PbS | 660 |
| 12. $PbCl_2$ | 720 |
| 13. $MnO_2$ | 610 |
| 14. Barium ricinoleate | 430 |
| 15. Normal calcium stearate | 315 |
| 16. HgO | 680 |
| 17. BaO | 535 |

From the above, it is apparent that the compositions containing is bismuth oxide or cuprous oxide produce products having satisfactory tensile strengths of about 1,100 to 1,300 p.s.i., while other compounds did not; (i.e., other compounds had tensile strengths of about 300–700 p.s.i.); satisfactory tensile strengths being those above about 1,000 p.s.i. Furthermore, the rubbery products co-vulcanized in the presence of bismuth oxides or cuprous oxide were dense, homogeneous, rubbery products, whereas the other products were porous, non-homogeneous mixtures. In a like manner poor results were obtained employing 5 parts by weight of cupric oxide, nickel oxide, antimony trioxide, chromium trioxide, vanadium penta-oxide or vanadium trioxide in compositions otherwise containing the same ingredients as in the original Butyl–GR–S master batch.

*Example II*

The following three batches (A, B, C) are compounded on a laboratory mill:

| A | | B | | C | |
|---|---|---|---|---|---|
| Natural rubber (smoked sheet) | 100 | Butyl rubber (GR-I-17) | 100 | Butyl reclaim | 166 |
| Zinc oxide | 5 | Carbon black (MPC black) | 50 | Zinc oxide | 3 |
| Sulfur | 3 | Stearic acid | 0.5 | Tetramethyl thiuram disulfide | 1.25 |
| Stearic acid | 1 | Zinc oxide | 5 | $Bi_2O_3$ | 10 |
| 2-mercapto-benzothiazole | 1 | Tetramethyl thiuram disulfide | 1.25 | | |
| | | Sulfur | 2 | | |

The above batches are then blended in the following proportions by weight, and subsequently subjected to vulcanization at 307° F. for 30 minutes.

| Batch | Compositions | | | | | |
|---|---|---|---|---|---|---|
| | 1 | 2 | 3 | 4 | 5 | 6 |
| A | 3 | 3 | 3 | 9 | 9 | 9 |
| B | | 90 | 45 | | 90 | 45 |
| C | 90 | | 45 | 90 | | 45 |

The following physical properties are obtained:

| | 1 | 2 | 3 | 4 | 5 | 6 |
|---|---|---|---|---|---|---|
| Tensile strength, p.s.i. | 1,050 | 650 | 1,625 | 1,080 | 420 | 1,280 |
| Elongation, percent | 560 | 505 | 605 | 545 | 475 | 570 |

It will be observed that compositions 1, 3, 4 and 6, which contain $Bi_2O_3$ possess satisfactory physical properties as to tensile strength and elongation. It is also noted that compositions 2 and 5 which contain no $Bi_2O_3$ do not possess satisfactory tensile strength or elongation. Also, the vulcanized pads of compositions 2 and 5 have a peculiar porous, cracked, blistered and non-homogeneous appearance associated with "contaminated" Butyl.

One particularly advantageous use for the Butyl rubber co-vulcanizates of the present invention is in pneumatic tires of either the inner tube containing variety or in a tubeless type tire.

Referring now to the drawing, the single figure depicts a pneumatic tubeless tire which comprises a hollow toroidal type member which is substantially U-shaped in cross-section by virtue of an open portion which extends around the inner periphery of the member. In other words, the tire is of a tubular type structure which has a cross-section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air sealing means, such as a plurality of ribs (not shown) to aid in adhesion to rim 12 when the tire is inflated.

The outer surface of the tire also includes tread area 13 and sidewalls 14. The open portion of the horseshoe-shaped tire faces that portion of the inner circumference of the tire which is adjacent the said area 13 of the tire. The remaining construction of the tire may vary according to conventional fabrication, but in general, the tire is a multi-layered type of structure with an outer layer as above-mentioned. The layer next adjacent the outer layer generally comprises a carcass 15 which includes a rubber which has incorporated therein a fabric composed of a plurality of cotton, rayon or nylon cords, etc. The tire also includes an inner lining advantageously made from rubber, e.g. Butyl rubber, natural rubber and/or co-vulcanizates (or partially cured co-vulcanizates) of Butyl rubber and natural rubber, or Butyl rubber with a Buna type rubber, or butyl and buna preferably with natural rubber, all produced according to the present invention. The inner lining must be substantially impermeable to air. For example, the lining may advantageously comprise natural rubber, neoprene-type rubber (i.e., polychlorobutadiene rubber) a rubbery copolymer, or mixtures or co-vulcanizates prepared according to the present invention of any of the above, wherein the copolymer comprises the reaction product of about 70–99.5 weight percent of a $C_4$–$C_7$ isolefin, such as isobutylene, and about 0.5–30 weight percent of a $C_4$–$C_{14}$ multi-olefin, such as isoprene which has been at least partially vulcanized. The above multi-layers, at least three in number, are conventionally bonded or otherwise adhered together, for example, by cementing and/or especially by vulcanization, co-vulcanization according to the present invention, etc., to form a tire of a unitary structure.

The Butyl rubber co-vulcanized compositions of the present invention may be employed generally throughout the tire and may be used alone or in admixture with natural rubber and/or co-vulcanized rubber or certain synthetic rubbers to include chloroprene rubber, polyisoprene, butadiene or isoprene vinyl pyridine copolymers, and particularly GR–S rubber, Buna–N rubber, etc. However, for the inner lining of the tire, ordinary Butyl rubber, Butyl rubber co-vulcanized with natural rubber, natural rubber, or mixtures thereof is preferred. Also, whereas the inner lining may comprise the Butyl-containing rubber compounds before mentioned, the other layers of the tire such as the intermediate carcass layer and/or the outer layer (including the tread area, the sidewall and the outer bead portions, etc.) may comprise Butyl rubber co-vulcanized with other conventionally employed rubbers according to the present invention, such as natural rubber and synthetic rubbers (especially highly unsaturated synthetic rubbers) and mixtures thereof (and reclaimed mixtures thereof) especially to include GR–S rubber, natural rubber and/or Buna–N rubber.

A tubeless tire may comprise a casing of an outer layer including the tread, sidewall, outer bead portions, etc., of butyl rubber co-vulcanized with natural rubber, GR–S rubber and/or Buna–S rubber or mixtures thereof, reclaimed mixtures of these rubbers or mixtures of Butyl with equivalent highly unsaturated rubbers which have been co-vulcanized. It also preferably comprises an intermediate layer or carcass of the above rubbers or combinations thereof, especially to include compositions containing butyl rubber, alone or co-vulcanized with natural rubber, GR–S rubber, Buna-N rubber combinations thereof, and their equivalents.

In another embodiment, the inner layer of the tire which may be Butyl rubber alone, Butyl rubber co-vulcanized with saturated rubbers, Butyl rubber co-vulcanized with highly unsaturated rubbers according to the present invention, or an admixture thereof, which has been at least partially vulcanized by heating for about 3–60 minutes or more at about 100° to 350° F. or higher with about 0.2 to 40.0 (especially 1 to 25) weight percent sulfur on a basis of the weight of the total rubber or rubbers as hereinbefore-mentioned and which has been cured with any of the heretofore disclosed curing compositions, especially to include curing compositions comprising sulfur and the hereinbefore disclosed bismuth oxides or cuprous oxide and optionally but preferably with an additional bivalent metal oxide, preferably zinc oxide.

While there are above described a number of specific embodiments of the present invention, it is obviously possible to produce other embodiments and various equivalent modifications and variations thereof without departing from the spirit of the invention or the scope of the appended claims.

What is claimed is:

1. A composition comprising a co-vulcanizable admixture of about 1 to 99 parts by weight of a rubbery copolymer containing a major proportion of a $C_4$–$C_8$ isoolefin and a minor proportion of a $C_4$–$C_{10}$ multiolefin with about 1 to 99 parts by weight of a highly unsaturated rubber selected from the group consisting of natural rubber, rubbery copolymers of butadiene and styrene, rubbery copolymers of butadiene and acrylonitrile, and mixtures thereof, sulfur, and 2 to 30 parts of a co-vulcanization aid selected from the group consisting of oxides of bismuth, cuprous oxide and mixtures thereof.

2. A composition comprising a co-vulcanizable admixture of about 1 to 99 parts by weight of a rubbery copolymer of a major proportion of an isoolefin and a minor proportion of a conjugated diolefin, about 1 to 99 parts by weight of a highly unsaturated rubber selected from the group consisting of natural rubber, rubbery copolymers of butadiene and styrene, rubbery copolymers of butadiene and acrylonitrile, and mixtures thereof, sulfur, and 2 to 30 parts of a co-vulcanization aid selected from the group consisting of oxides of bismuth, cuprous oxide, and mixtures thereof.

3. A composition comprising a co-vulcanizable admixture of about 1 to 99 parts by weight of a rubbery isoolefin-multiolefin copolymer, said isoolefin in major proportion and said multiolefin in minor proportion in said copolymer sulfur, about 0–50 parts by weight of zinc oxide per 100 parts of rubber hydrocarbons, another rubber selected from the group consisting of natural rubber, rubbery copolymers of butadiene and styrene, rubbery copolymers of butadiene and acrylonitrile, and mixtures thereof, and 2 to 30 parts of a co-vulcanization aid selected from the group consisting of oxides of bismuth, cuprous oxide, and mixtures thereof.

4. A composition comprising about 100 parts by weight of a co-vulcanizable admixture of about 1% by weight to less than about 96% by weight of a rubbery copolymer containing about 85–99.5 weight percent of a $C_4$–$C_7$ isoolefin, and about 15 to 0.5 weight percent of a $C_4$–$C_{10}$ multi-olefin with more than about 4% by weight to about 99% by weight of at least one other rubber selected from the group consisting of natural rubber, rubbery copolymers of butadiene and styrene, rubbery copolymers of butadiene and acrylonitrile, and mixtures thereof, about 2 to 50 parts by weight of sulfur, about 3 to 30 parts by weight of a member selected from the group consisting of oxides of bismuth, cuprous oxide and mixtures thereof, about 0–30 parts by weight of zinc oxide, and about 0–5 parts by weight of a sulfur-containing accelerator.

5. A composition comprising a co-vulcanizable admixture of about 1% by weight to less than about 96% by weight of a rubbery isoolefin-multiolefin copolymer, more than about 4% by weight to about 99% by weight of said isoolefin in major proportion and said multiolefin in minor proportion in said copolymer at least another highly unsaturated rubber selected from the group consisting of natural rubber, rubbery copolymers of butadiene and styrene, rubbery copolymers of butadiene and acrylonitrile, and mixtures thereof, sulfur, a sulfur-containing accelerator, and 2 to 30 parts of a member selected from the group consisting of oxides of bismuth, cuprous oxide and mixtures thereof, that the composition is co-vulcanizable at a rate in excess of the vulcanization rate of any of the rubbers alone.

6. A process of preparing co-vulcanized blends of about 1 to 99 parts by weight of a rubbery isoolefin-multiolefin copolymer said isoolefin in major proportion and said multiolefin in minor proportion in said copolymer with about 1 to 99 parts by weight of a highly unsaturated rubber selected from the group consisting of natural rubber, rubbery copolymers of butadiene and styrene, rubbery copolymers of butadiene and acrylonitrile, and mixtures thereof, which process comprises adding to about 100 parts by weight of the blend, vulcanizing amounts of sulfur, and about 3 to 30 parts by weight of a metal oxide selected from the group consisting of bismuth oxides, cuprous oxide and mixtures thereof, and vulcanizing the resulting mixture formed in the presence of about 0.1 to 5.0 parts by weight of a sulfur-containing vulcanization ultra accelerator, at a temperature of about 250° to 400° F. at a co-vulcanization rate faster than the vulcanization rate of any rubber alone.

7. A process according to claim 6 in which the co-vulcanization temperature is between about 280° to 320° F.; the co-vulcanization being in the presence of about 3–50 parts by weight of added zinc oxide.

References Cited in the file of this patent

UNITED STATES PATENTS

| 2,566,384 | Tilton | Sept. 4, 1951 |
| 2,575,249 | Connell et al. | Nov. 13, 1951 |
| 2,741,295 | Kindle et al. | Apr. 10, 1956 |
| 2,749,960 | Schwartz | June 12, 1956 |

OTHER REFERENCES

"Synthetic Rubber," by Whitby, published 1954 by Wiley & Sons, p. 858.